United States Patent [19]
Corbishley et al.

[11] Patent Number: 6,142,359
[45] Date of Patent: Nov. 7, 2000

[54] METHOD OF CONNECTING PIPE-IN-PIPE STRUCTURES

[75] Inventors: Terence J. Corbishley, Staffordshire; Jonathan G. Corbishley, Surrey, both of United Kingdom

[73] Assignee: T J Corbishley (Developments) Ltd., Staffordshire, United Kingdom

[21] Appl. No.: 09/367,581
[22] PCT Filed: Feb. 17, 1998
[86] PCT No.: PCT/GB98/00486
  § 371 Date: Nov. 16, 1999
  § 102(e) Date: Nov. 16, 1999
[87] PCT Pub. No.: WO98/36199
  PCT Pub. Date: Aug. 20, 1998

[30] Foreign Application Priority Data

Feb. 17, 1997 [GB] United Kingdom .................. 9703218

[51] Int. Cl.[7] .................................................. F16L 47/00
[52] U.S. Cl. ............................................................ 228/104
[58] Field of Search ............................................ 228/104

[56] References Cited

U.S. PATENT DOCUMENTS

| | | | |
|---|---|---|---|
| 2,475,635 | 7/1949 | Parsons | 138/65 |
| 2,696,835 | 12/1954 | Kaiser | 138/87 |
| 4,153,194 | 5/1979 | Leornard, Jr. | 228/29 |
| 4,416,409 | 11/1983 | Muller et al. | 228/173 R |
| 4,893,944 | 1/1990 | Leroux | 374/46 |
| 5,085,082 | 2/1992 | Cantor et al. | 73/622 |
| 5,184,850 | 2/1993 | Wermelinger | 285/21 |
| 5,375,890 | 12/1994 | Andersen et al. | 285/21 |
| 5,794,663 | 8/1998 | Parsons | 138/65 |

FOREIGN PATENT DOCUMENTS 2 268 564  1/1994  United Kingdom .

*Primary Examiner*—Patrick Ryan
*Assistant Examiner*—Zidia T. Pittman
*Attorney, Agent, or Firm*—Westman, Champlin & Kelly, P.A.

[57] ABSTRACT

A method of forming a structural member by connecting end-to-end first and second tubular structures, with each tubular structure having an inner tubular member (1a, 1b) located within a co-extending outer tubular member (3a, 3b). The inner tubular member (1a, 1b) is longer than the outer tubular member (3a, 3b). The inner and outer tubular members (1b, 3b) of the second tubular structure are movable relative to each other in an axial direction. The method includes joining together adjacent ends of the inner tubular members (1a, 1b) of the first and second tubular structures respectively, displacing the outer tubular member (3b) of the second tubular structure axially relative to the inner tubular member (1b) of the second tubular structures until it abuts against and is contiguous with the outer tubular member (3a) of the first tubular structure, and at least partially overlies the inner tubular member (1a) of the first tubular structure, and then joining together the abutting outer tubular members (3a, 3b) to thereby form the structural member.

9 Claims, 3 Drawing Sheets

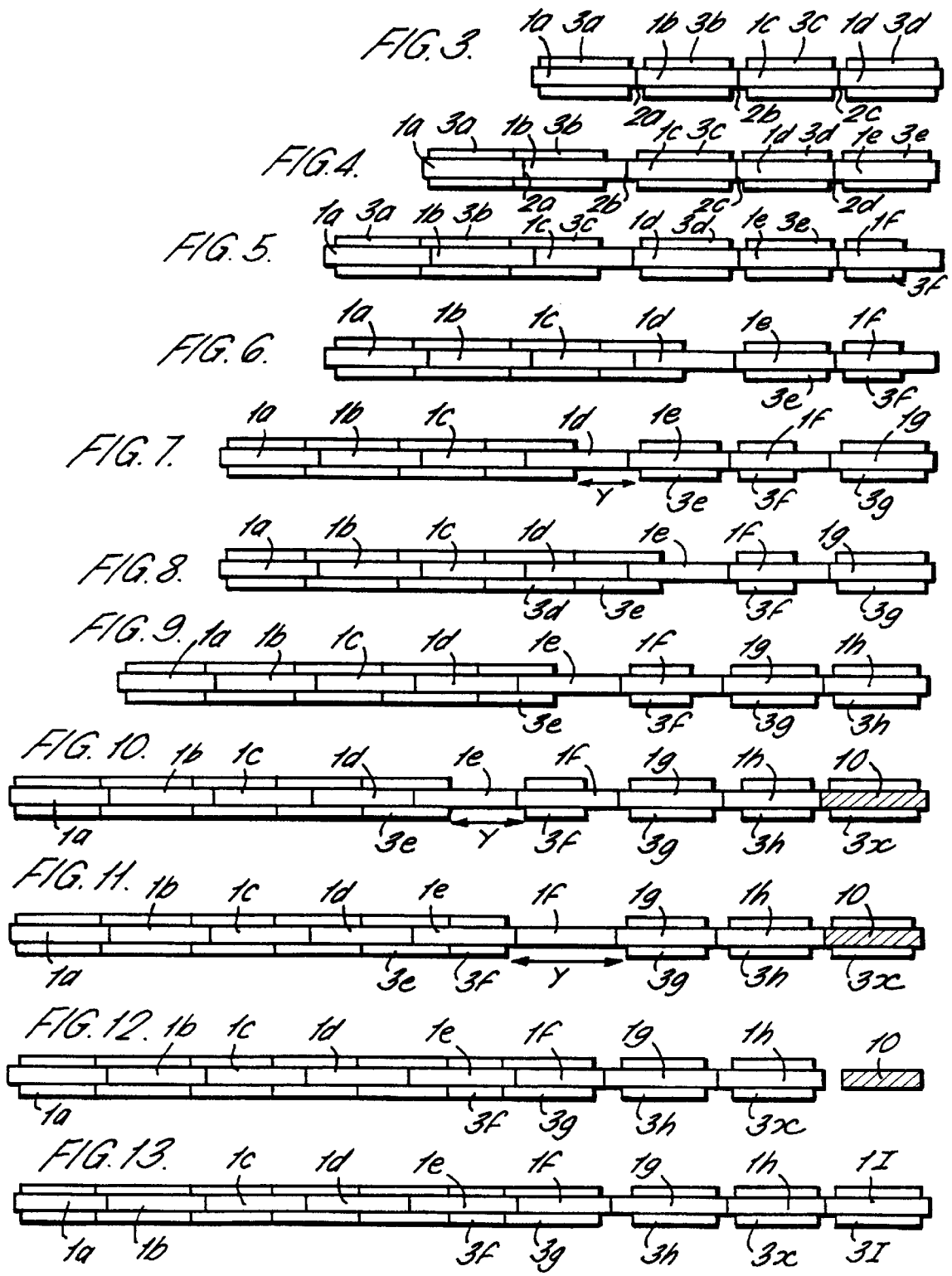

METHOD OF CONNECTING PIPE-IN-PIPE STRUCTURES

The invention relates to a method of connecting together tubular members which have co-extending elongate members therewithin. The invention will be described with reference to its use in connecting together the pipes of a pipeline and tubular structural members such as those typically utilised in the offshore oil and gas industry.

With the growth of the offshore oil and gas industry, it is necessary to install prefabricated pipelines between offshore oil and gas fields and onshore processing facilities and between different offshore locations. These may be for processing purposes or for loading the oil or gas into shuttle tankers from offshore loading buoys.

To meet the need to install pipelines with a high degree of reliability, it is possible to use barges and vessels with several aligned welding, inspection and coating stations that can fabricate a pipeline from a large number of short lengths of coated pipe, typically 12 metres long. The welded joints of the pipeline have then to be inspected and coated before the pipeline is lowered to the sea bed down a long curved stinger or ramp.

A further alternative is to fabricate, at a suitable shore site, a bundled assembly formed of a pipeline or group of pipelines housed within a large diameter outer steel pipeline, known as a carrier pipe. The void space within the carrier pipe and around the pipelines housed within it is sealed to prevent the ingress of water.

A particular trend is to install pipelines which are to operate at high temperatures and/or pressures, which give rise to significant integral forces when the pipeline is prevented from expanding or allowed only partial expansion.

In use, submarine pipelines are often required to maintain certain fluid temperatures, preventing adverse affect such as hydrate formation or wax deposition. Thermal insulation of the pipelines helps to avoid this and is currently achieved by the application to their external surface a suitable insulation material. The materials are presently applied by various processes including extrusion, impingement, wrapping and casting.

For high fluid temperatures and pressures, provision of thermal insulation is achieved by housing the fluid carrying pipeline or flowline, as it is commonly termed, within an outer and additional pipeline. This is known as a "pipe-in-pipe" system. The annulus between the inner flowline and outer pipeline may be filled with thermal insulant having low order thermal conductivity, such as polyurethane foams, mineral wool or ceramic microspheres. Alternatively, the annulus gap may be a vacuum or full of gas.

Also a particular trend is to install pipelines which are to operate at high pressures and high temperatures, where if the pipeline is prevented from expanding or is allowed only limited expansion, would lead to the pipeline experiencing induced strains beyond the elastic limit of the material from which it is made.

To form elongate tubular structural members such as the tethers on Tension Leg Platforms, short lengths of "tube-in-tube" structural members are adjoined end to end by either butt welding, internal or external collars secured by fillet welds or mechanical means such as screwed ends or splined connectors.

Where pipe-in-pipe pipelines or tube-in-tube structural members are constructed, it is necessary to complete the connection together of two inner pipes or two inner structural members prior to connecting together the two outer pipes or two outer structural members. Where the annulus between the inner pipe or tube and the outer pipe or tube contains materials or mechanical apparatus which prevent relative longitudinal movement of the two co-extending pipes or structural members, there is a technical problem faced in closing the gap between the ends of the outer pipes or structural member which is required for access to connect the inner pipes or structural members.

A solution has been proposed in our co-pending patent application GB 9623131.1. This method of joining pipelines utilises an intermediate member which is screwed on a thread relative to a first pipe section in order to bring the intermediate member into abutment with the second pipe section. Once the intermediate and second pipe members are brought into abutment with each other, they can be welded together. This method enables the assembler to access the interior flowline before fixing together the external tubular members, whilst eliminating the need for fillet welds which are prone to failure and which are hard to x-ray.

A solution to the problem of joining pipe-in-pipe or tube-in-tube members is now proposed for situations where the inner and outer pipe or tube members are able to move relative to each other in the longitudinal direction.

According to the invention there is therefore provided a method of forming a structural member by connecting end-to-end first and second tubular structures, each tubular structure comprising an inner tubular member located within a co-extending outer tubular member, the inner tubular member being longer than that of the outer tubular member so that at least a portion of one end of the inner tubular members projects from the corresponding end of the outer tubular member, in which the inner and outer tubular members of the second tubular structure are movable relative to each other in an axial direction, the method being characterised by the steps of joining together adjacent ends of the inner tubular members of first and second tubular structures respectively, displacing the outer tubular member of the second tubular structure axially relative to the inner tubular member of the second tubular structures until it abuts against and is contiguous with the outer tubular member of the first tubular structure, and at least partially overlies the inner tubular member of the first tubular structure, and joining together the abutting outer tubular members to thereby form the structural member.

Preferably the inner members are joined together by welding.

The welded connection between the inner members is preferably checked, by, for example, x-ray, before the second outer member is displaced.

In a further embodiment the first tubular structure comprises a structural member formed from a plurality of individual tubular structures previously joined together.

Preferably the method further comprises the step of sliding a sleeve onto the inner tubular member of the first tubular structure, wherein the sleeve is of a shorter length than the portion of the inner tubular member projecting from the outer tubular member, displacing the sleeve axially relative to the inner tubular member until it abuts against and is contiguous with the outer tubular member of the first tubular structure and overlies a part of the inner tubular member of the first tubular structure.

In a preferred embodiment of the invention the steps of removably attaching an end of a tubular dummy member to an end of the inner tubular member of the first tubular structure, said dummy member being located within a co-extending outer tubular member, displacing the outer tubular member axially along the dummy member until it is wholly positioned on the adjacent inner tubular member and removing the dummy member.

Preferably the tubular structures further comprise an intermediate tubular member surrounding and co-axial with the inner tubular member and located within and co-axial with the outer tubular member, said intermediate member being shorter than the inner tubular members, the method of connecting said structures further comprising the step of displacing the intermediate tubular member of the second tubular structure together with the corresponding outer tubular member axially along the inner tubular member of the second tubular structure until the intermediate tubular members abut and are contiguous with each other, and joining the abutting intermediate tubular members and then abutting and joining the outer tubular members.

The invention also provides an inner pipe comprising a plurality of contiguous inner tubular members and an outer pipe comprising a plurality of contiguous outer tubular members, said outer and inner pipes defining an annulus therebetween.

A preferred embodiment of the present invention will now be described, by way of example only, with reference to the accompanying drawings in which:

FIGS. 3 to 13 illustrate the method steps according to the present invention.

Figure 1:
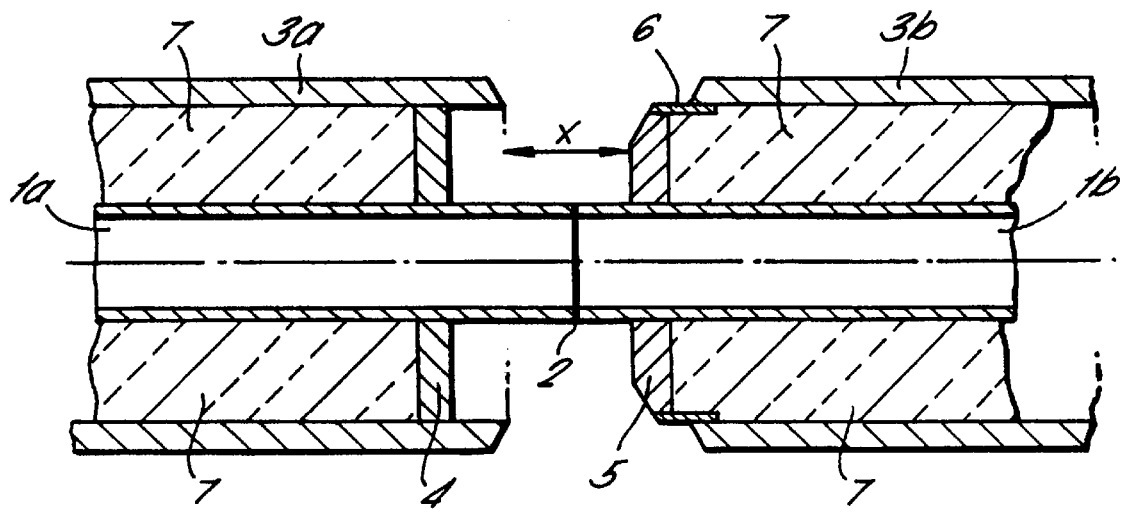
FIG. 1 shows a side sectional elevation of two adjacent inner pipes and parts of the surrounding outer pipe.

Referring to FIG. 1, there are shown two tubular members to be joined to form a tubular structure, in this illustration being pipes for a flowline. These pipes comprise inner pipes 1a, 1b, joined end-to-end by a welded connection 2, to form a flowline, and an outer pipe 3a, 3b, within which the inner pipes 1a, 1b are located. Each of the outer pipes 3a, 3b terminates short of each end of the respective inner pipes 1a, 1b. Supporting each end of the outer pipes 3 on their respective inner pipes 1 are a pair of bulkheads 4, 5, one positioned at each end of the outer pipe. The bulkheads 4, 5 are substantially annular disks of rubber/steel or other suitable material which is capable of being slid along the inner pipe 1. The bulkhead 5 defines a leading end of the outer pipe 3 and is attached to the outer pipe 3 by means of a metallic backing plate 6, such that the bulkhead 5 does not actually lie within the outer pipe 3 so as to avoid damage to the bulkhead when the outer pipes are joined by welding. Bulkhead 4, on the other hand, is positioned within the outer pipe 3. The bulkheads 4, 5 fix the position of the outer pipes 3 relative to the inner pipes 1. In a preferred embodiment of the invention the annular spaces defined between the co-axial outer pipes 3 and inner pipes 1 are filled with a thermal insulant 7. Alternatively the annular spaces may be evacuated or filled with an insulating gas.

The perimeter of the leading edge of the bulkhead 5 is preferably bevelled with a 30° bevel. The ends of each outer pipe 3a are also similarly bevelled.

Figure 2:
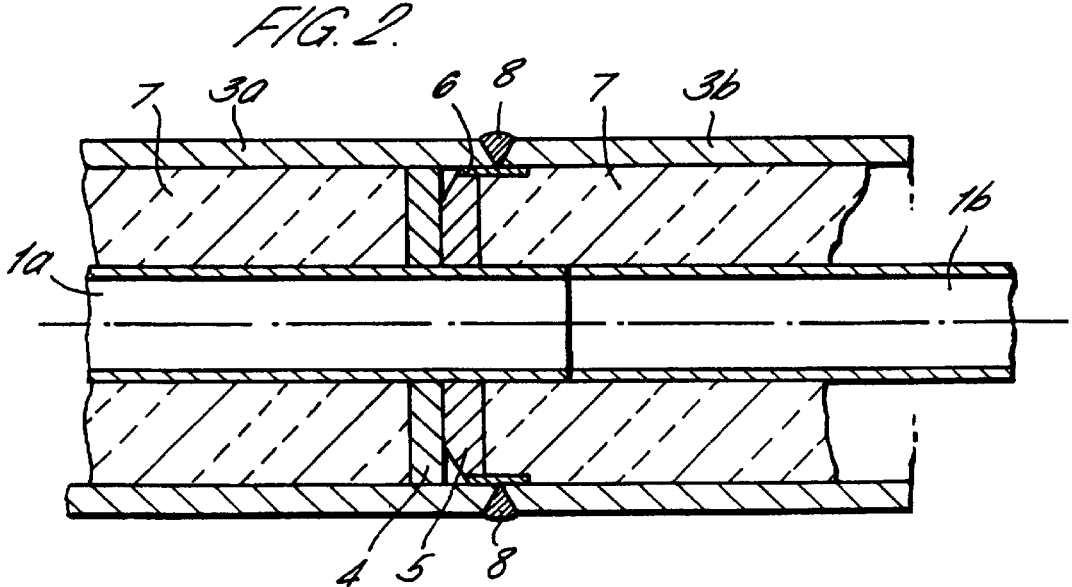
FIG. 2 shows the sectional elevation of FIG. 1 with the outer pipes adjoining and welded together.

Two tubular structures are placed with their inner pipes 1a, 1b adjacent each other and are joined, typically by welding together as shown in FIG. 3. Where inner pipes 1a, 1b are adjoined by welding, the first welded connection 2a between inner pipes 1a and 1b is x-rayed to check the integrity of the weld. If the connection 2a is satisfactory, outer pipe 3b is slid axially along inner pipe 1b and partially onto inner pipe 1a until the leading bulkhead 5 of outer pipe 3b abuts the bulkhead 4 of outer pipe 3a. The bevel on the leading edge of the bulkhead 5 eases the feeding of the bulkhead 5 into the adjacent outer pipe 3a. When in position, the bevelled ends of the outer pipes 3a, 3b are welded together to form a welded connection 8 as shown in FIG. 2. The presence of the backing plate 6 facilitates welding and prevents damage to the bulkhead 5 and any insulating materials 7 from the heat created by the welding process.

In commercial applications it may be preferable to join together four pipes at a time, e.g. 1a, 1b, 1c and 1d as shown in FIG. 3. Thus as the outer pipes 3a and 3b are joined, at the same time a further inner pipe 1e is located adjacent pipe 1d and welded thereto, as shown in Fig.4.

When the welded connection 2b has been x-rayed and found to be satisfactory the outer pipe 3c is shuttled along the welded pipeline until it abuts outer pipe 3b and is welded thereto to create welded connection 8b. A new inner pipe if carrying outer pipe 3f is welded to the end of inner pipe 1e as shown in FIG. 5. This process of welding, x-raying and shuttling continues as shown in FIGS. 6 to 9.

As the outer pipes 3 are shorter than inner pipes 1, eventually this discrepancy needs to be accommodated, as follows.

The distance X between the bulkheads 4 and 5 on adjacent pipes is typically 400 mm. Obviously, as each outer pipe 3 is welded to its neighbour the gap Y between the welded length of outer pipes 3 and the next outer pipe will grow once this gap Y reaches a predetermined length, up to the full length of outer pipe 3a, but typically 8 metres, as in FIG. 11, a dummy pipe 10, supporting an outer pipe 3x is push fitted onto the end of the last inner pipe 1h in the welded flowline. The outer pipe 3x is shuttled along until it is wholly located over the adjacent inner pipe 1h. The dummy pipe 10 is removed as shown in FIG. 12 and the whole procedure starts again with the addition of a new pipe member 1I,3I to the end of the flowline, the x-raying of welded connection 2f prior to the shuttling of outer pipe 3h, followed by the welding of outer pipe 3h to 3g.

Sometimes outer sleeves may be used which are shorter than usual, eg outer pipe 3f which is shorter than outer pipes 3a, 3b, 3c, 3d, such that when it is slid to abut and connected to outer pipe 3e, the length of the protrusion of inner pipe 1e beyond outer pipe 3f is the same length as that of inner pipe 1a to outer pipe 3a. Such sleeves may be used without the benefit of a dummy pipe and are slid straight onto the exposed length of inner pipe. This means that the gap Y will grow faster than if all the outer pipes are of the same length and the use of a dummy pipe 10 will be more frequently needed and enables the operator to control where the extra outer pipes 3x are located.

Thus the ability to x-ray each pipe joint 2 before the outer pipe is moved over it and welded to the adjacent outer pipe means that the integrity of each welded connection 2 is ensured obviously any appropriate means of testing the welded connection, other than by x-ray, can be used.

Although for convenience only a single flowline made up of inner pipes 1a, 1b, 1c. . . 1I. is illustrated, a plurality of parallel pipes or other elongate members maybe housed within the outer pipes. Furthermore, whilst the tubular members described in the aforegoing description are cylindrical pipes for a flowline, the tubular members could have any chosen cross section.

Figure 14:
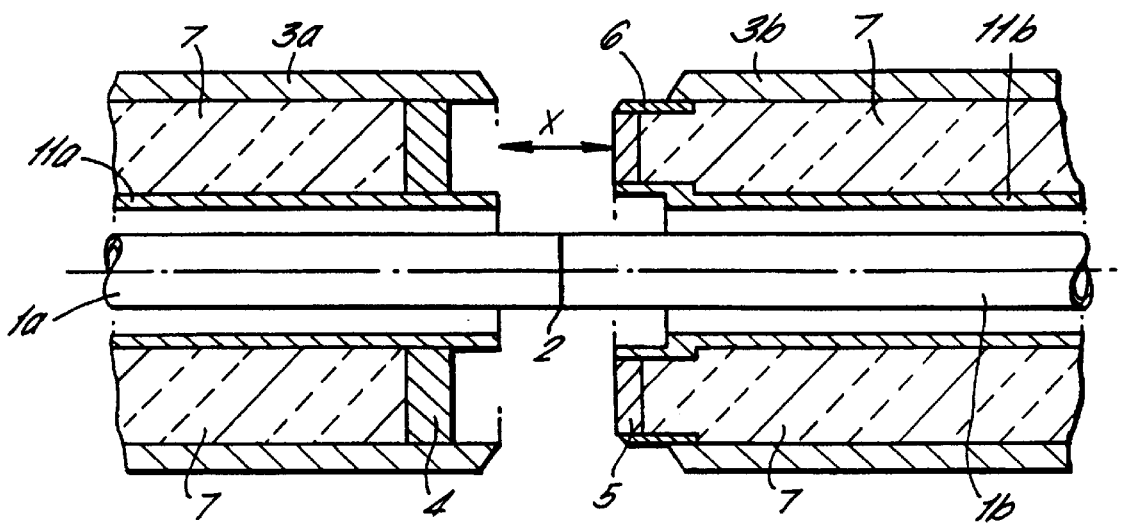
FIG. 14 and 15 show similar side sectional elevations to those of FIGS. 1 and 2 but with an intermediate pipe located between the inner pipes and the outer pipes.
Figure 15:
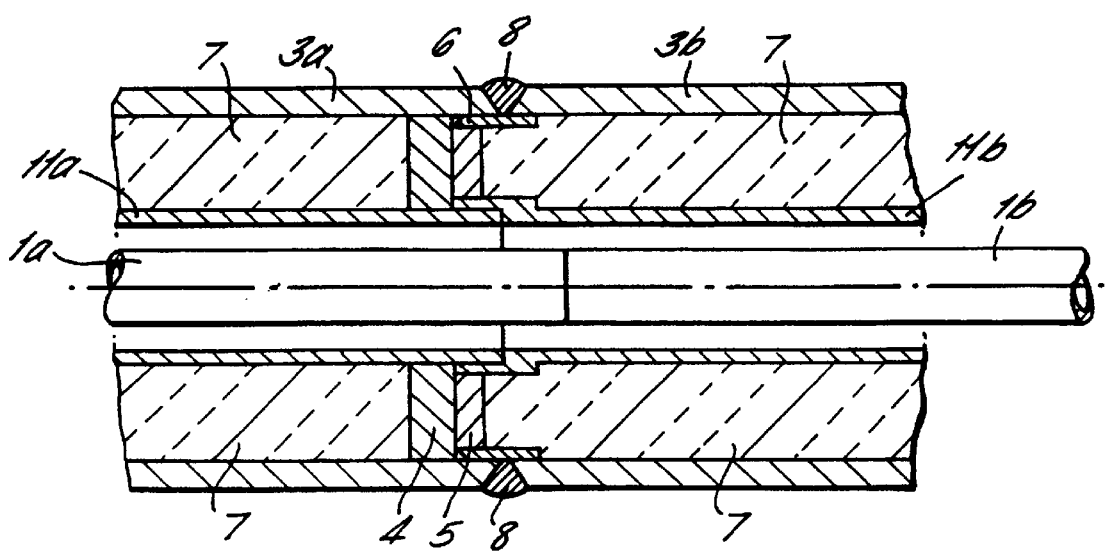

Yet another embodiment of the invention is shown in FIGS. 14 and 15. Referring to FIG. 14 there are shown two tubular structures, such as pipes for a flowline. These structures comprise inner pipes 1a, 1b, joined end to end, preferably by a welded connection 2, to form a flowline, outer pipes 3a, 3b and intermediate pipes 11a, 11b. The inner pipes 1a and 1b are located within the intermediate pipes 11a, 11b. Each of the outer pipes 3a, 3b and intermediate pipes 11a, 11b terminates short of each end of respective inner pipes 1a, 1b. The intermediate pipes 11a, 11b are adjoined by mechanical connection, welding or other suitable means. When in position, the bevelled ends of the outer pipes 3a, 3b are again welded together to form a welded connection 8 as shown in FIG. 15. outer pipes 3a, 3b, intermediate pipes 11a, 11b, bulkheads 4 and 5 and inner pipes 1a, 1b are assembled utilising the shuttling technique as described above.

Again a plurality of parallel pipes or other elongate members may be housed with the intermediate pipes.

The annular gaps between the inner and intermediate pipes and the outer and intermediate pipes may be filled with thermal insulant, air, a gas such as nitrogen or carbon dioxide or left empty or evacuated. Additional fluid may be passed through the gap between the inner pipe and the intermediate pipe to provide a means of either heating or cooling the inner pipes.

Where access is required to join the intermediate pipes by welding or other mechanical means, the intermediate pipes may protrude beyond the ends of the outer pipes. The gap between the ends of the outer pipes may then be closed by a short length of outer pipe made up in two halves, a short length collar of length greater than the gap between the outer pipes, the collar being initially positioned inside or on the outside of the outer pipe. To facilitate assembly of the outer pipes in this way, the bulkheads 4 and 5 may be positioned at the end or at a distance back from the ends of the outer pipes to facilitate welding. The gap between bulkheads 4 and 5 may be either filled with thermal insulant or air, left empty, or purged with gas such as nitrogen or carbon dioxide.

As an alternative to utilising the backing plate 6, the bulkhead 5 may be positioned within the outer pipe 3 to prevent damage during welding of the outer pipes. The gap between the bulkhead 4 and 5 then may be either filled with thermal insulant or air, left empty, or purged with gas such as nitrogen or carbon dioxide.

A further alternative is to pass cooling or heating fluid, typically water, through the gap over the full or part length of the pipeline. For high temperatures and/or pressures the gap between the inner pipe and the intermediate pipe may be sufficient to allow expansion or partial expansion of the inner pipe, laterally, in a spiral formulation or longitudinally beyond the ends of the pipeline, or a combination of all three.

Although the foregoing describes the joining of the outer pipes welding, they may alternatively be joined by mechanical connectors, or other suitable means.

What is claimed is:

1. A method of forming a structural member by connecting end-to-end a plurality of tubular structures, each tubular structure comprising an inner tubular member (1a, 1b, 1c) located within a co-extending outer tubular member (3a, 3b, 3c), the inner tubular member (1a, 1b, 1c) being longer than the outer tubular member (3a, 3b, 3c) so that at least a portion of one end of the inner tubular members (1a, 1b, 1c) projects from the corresponding end of the outer tubular member (3a, 3b, 3c), in which the inner and outer tubular members of the tubular structures are movable relative to each other in an axial direction, the method being characterized by the steps of joining together simultaneously abutting adjacent ends of outer tubular members (3a, 3b,) of one pair of adjacent tubular structures and abutting adjacent ends of the inner tubular members (1b, 1c) of another pair of adjacent tubular structures, displacing the outer tubular member (3c) of a tubular structure adjoining the one pair axially relative to its inner tubular member (1c) until it abuts against and is contiguous with the outer tubular member (3b) of the one pair of tubular structures, and at least partially overlies the inner tubular member (1b) of the one pair of tubular structures.

2. A method as claimed in claim 1 in which the inner tubular members (1a, 1b) are joined together by welding.

3. A method as claimed in claim 2 in which the welded connection (2) between the adjacent inner tubular members (1a, 1b) is checked, by, for example, x-ray, before the outer tubular member (3b) is displaced.

4. A method as claimed in claim 1 in which the first tubular structure comprises a structural member formed from a plurality of individual tubular structures (1a, 2a; 1b, 3b) previously joined together.

5. A method as claimed in claim 1 further comprising the step of sliding a sleeve (3f) onto the inner tubular member (1a, 1b, 1c, 1d, 1e) of the first tubular structure, wherein the sleeve (3f) is of a shorter length than the portion of the inner tubular member (1a, 1b, 1c, 1d, 1e) projecting from the outer tubular member (3e), displacing the sleeve (3f) axially relative to the inner tubular member (1a, 1b, 1c, 1d, 1e) until it abuts against and is contiguous with the outer tubular member (3e) of the first tubular structure and overlies a part of the inner tubular member (1a, 1b, 1c, 1d, 1e) of the first tubular structure.

6. A method as claimed in claim 1 further comprising the steps of removably attaching an end of a tubular dummy member (10) to an end of the inner tubular member (1a, 1h) of the first tubular structure, said dummy member (10) being located within a co-extending outer tubular member (3x), displacing the outer tubular member (3x) axially along the dummy member (10) until it is wholly positioned on the adjacent inner tubular member (1h) and removing the dummy member (10).

7. A method as claimed in claim 1 in which the tubular structures further comprise an intermediate tubular member (11) surrounding and co-axial with the inner tubular member (1) and located within and co-axial with the outer tubular member (3), said intermediate member (11) being shorter than the inner tubular members (1), the method of connecting said structures further comprising the step of displacing the intermediate tubular member (11b) of the second tubular structure together with the corresponding outer tubular member (2b) axially along the inner tubular member (1b) of the second tubular structure until the intermediate tubular members (11a, 11b) abut and are contiguous with each other, and joining the abutting intermediate tubular members (11a, 11b) and then abutting and joining the outer tubular members (3a, 3b).

8. A method as claimed in claim 1 in which the tubular structures comprise a plurality of parallel inner tubular members, each of which is joined to adjacent ends of inner tubular members in adjoining tubular structures.

9. A pipe-in-pipe structural member comprising a plurality of tubular structures connected end-to-end by the method claimed in claim 1 to provide an inner pipe comprising a plurality of contiguous inner tubular members (1a, 1b, 1c, 1d, 1e) and an outer pipe comprising a plurality of contiguous outer tubular members (3a, 3b, 3c, 3d, 3e), said outer and inner pipes defining an annulus therebetween.

* * * * *